United States Patent Office 3,561,999
Patented Feb. 9, 1971

3,561,999
METALLIC STEARATE COATED CLAYS AND THE PROCESS OF PRODUCING SAME
Joseph Iannicelli, Macon, Ga., assignor to J. M. Huber Corporation, Locust, N.J., a corporation of New Jersey
No Drawing. Filed Dec. 6, 1967, Ser. No. 688,356
Int. Cl. C08h 17/06; C09c 3/00
U.S. Cl. 117—100                        6 Claims

ABSTRACT OF THE DISCLOSURE

The disclosure covers the coating of kaolin clays with a thin uniform film of water insoluble metallic stearate and the clays so coated. The process includes the steps of applying an aqueous dispersion of the stearate to the clay, followed by mixing, drying and pulverizing.

BACKGROUND OF THE INVENTION

(1) Field of the invention

The invention relates generally to the selective altering of the properties of kaolin clay by the coating of the clay particle with a generally uniform film of water insoluble metallic stearates. Clays so modified have improved properties when used in paints, rubbers, plastics, inks, papers, anti-caking applications, lubricants, thickening applications, cements, leather treatments, grinding aids, cosmetics, and the like.

(2) Description of the prior art

The dry blending of metallic stearates with clay is known; however, such blends do not produce a uniform product having similar properties to those of the invention, such as hydrophobicity. Other stearate clay combinations have been made by treating the clay with vaporized stearic acid but these have been laboratory curiosities which could not be practiced economically.

SUMMARY

The invention generally consists of altering the properties of kaolin clay by coating the clay particles with a thin uinform film of water insoluble metallic stearate. The clay may be either relatively dry or in a slurry form and a micronized dispersion of the metallic stearate is sprayed onto the dry clay or mixed in the slurry. The mixture is then dried and pulverized by any conventional method and is then ready for its end use. The percentage addition of the metallic stearate to the clay is not critical but the final clay properties will vary with the addition level.

DESCRIPTION OF THE PREFERRED EMBODIMENTS

The following examples illustrate several ways the invention may be practiced.

EXAMPLE 1

A hard South Carolina hard clay was treated with 1% of finely powdered calcium stearate, after which the mixture was pulverized in a Raymond Mill. In contrast to the product of the remaining examples, the dry blend modification was only weakly hydrophobic and was substantially wetted after 15 minutes in water. This product gave 5% caking on the same soy meal (50% protein) subjected to the caking test reported in Example 2 (9 p.s.i. for 2 weeks). Mastic compositions containing this product were moderately hydrophobic but exhibited cracking after 24 hours.

EXAMPLE 2

A micronized dispersion of calcium stearate (50%) in water was sprayed at a rate of 0.6 gallon per minute (2.5 pounds per minute) to a conveyor feeding 250 pounds crude South Carolina hard clay to a Raymond Mill. (Same as Example 1.) The thoroughly blended mixture of calcium stearate dispersion on clay was pulverized and flash dried in the Raymond Mill. The final product contained 1% calcium stearate as determined by chemical analysis and was intensely hydrophobic. After floating on water for 48 hours this product was substantially unwetted. This hydrophobic clay gave complete anti-caking protection to soy meal even when coated at a level of 0.1%. When this product was incorporated in polybutene mastic at a level of 50%, the mastic did not swell and crack, showing excellent water resistance even after immersion for 24 hours.

EXAMPLE 3

The process of Example 2 was repeated except that 3% calcium stearate as a dispersion was applied to the clay. The resulting clay product was extremely hydrophobic and was not wet by water after 24 hours contact.

EXAMPLE 4

A micronized dispersion of 200 pounds of 50% calcium stearate (dry basis) in water was mixed with 10,000 pounds of special Hydratex® (a non-dispersed fine particle coating clay having a mean particle diameter of .9 micron) slurry containing 29% solids. After stirring for 15 minutes the slurry was filtered and the filter cake tunnel dried and impact milled.

The resulting product was extremely hydrophobic and did not wet out in contact with water for 48 hours.

EXAMPLE 5

Example 4 was repeated using 400 pounds of calcium stearate dispersion. The product was similar to that of Example 4 with an increased hydrophobicity.

EXAMPLE 6

A micronized dispersion of 360 pounds of 50% calcium stearate (dry basis) in water was mixed with 18,000 pounds of pre-dispersed Hydrafine® (a fine particle coating clay having a mean particle diameter of .55 micron) slurry containing 56% solids. The slurry was then spray dried at an inlet temperature of 600° F. and an outlet temperature of 160° F., and then impact milled. The product when coated on paper produces an extremely high gloss coating exhibiting low pick on calendering.

The examples were repeated using zinc and lead stearates in place of the calcium stearate. The products were quite similar to the products of the calcium stearate examples.

The products of all of the examples exhibited a very high degree of uniformity as evidenced by the fact that aqueous dispersions of the product were homogeneous and settled as a single phase.

I claim:
1. The method of modifying kaolin clay which comprises mixing a micronized aqueous dispersion of a water insoluble metallic stearate with kaolin clay to provide a thin relatively uniform coat on the clay particles, drying the coated clay, pulverizing the coated clay and recovering a hydrophobic coated clay.

2. The method as claimed in claim 1 wherein the dispersion is sprayed onto relatively dry clay.

3. The method as claimed in claim 1 wherein the dispersion is mixed into a clay slurry.

4. The method as claimed in claim 1 wherein the metallic stearate is calcium stearate.

5. The method as claimed in claim 1 wherein the metallic stearate is zinc stearate.

6. The method as claimed in claim 1 wherein the metallic stearate is lead stearate.

References Cited

UNITED STATES PATENTS

| | | | |
|---|---|---|---|
| 2,344,073 | 3/1944 | Wright | 117—66 |
| 2,539,012 | 1/1951 | Diamond et al. | 117—100X |
| 2,904,267 | 9/1959 | Lyons | 106—288X |
| 2,927,862 | 3/1960 | Welch | 106—308X |
| 2,948,632 | 8/1960 | Albert et al. | 117—100X |
| 3,015,132 | 1/1962 | Bunting | 117—100X |

FOREIGN PATENTS

| | | | |
|---|---|---|---|
| 54,931 | 3/1967 | Germany | 106—288 |
| 634,492 | 1/1962 | Canada | 106—288 |

OTHER REFERENCES

Condensed Chemical Dictionary, 6th edition, Reinhold Publishing Co., N.Y., pp. 206, 661, 1249.

WILLIAM D. MARTIN, Primary Examiner

MATHEW R. P. PERRUNE, JR., Assistant Examiner

U.S. Cl. X.R.

106—288, 308